(12) United States Patent
Kouno et al.

(10) Patent No.: US 10,081,729 B2
(45) Date of Patent: Sep. 25, 2018

(54) (METH)ACRYLIC COPOLYMER, RESIN COMPOSITION, AND MOLDED PRODUCT OF SAID RESIN COMPOSITION

(71) Applicant: MITSUBISHI GAS CHEMICAL COMPANY, INC., Tokyo (JP)

(72) Inventors: Kazuki Kouno, Kanagawa (JP); Eiichi Honda, Kanagawa (JP)

(73) Assignee: MITSUBISHI GAS CHEMICAL COMPANY, INC., Tokyo (JP)

(*) Notice: Subject to any disclaimer, the term of this patent is extended or adjusted under 35 U.S.C. 154(b) by 0 days.

(21) Appl. No.: 14/917,110

(22) PCT Filed: Oct. 1, 2014

(86) PCT No.: PCT/JP2014/076252
§ 371 (c)(1),
(2) Date: Mar. 7, 2016

(87) PCT Pub. No.: WO2015/053145
PCT Pub. Date: Apr. 16, 2015

(65) Prior Publication Data
US 2016/0215139 A1 Jul. 28, 2016

(30) Foreign Application Priority Data

Oct. 7, 2013 (JP) .................................. 2013-210372

(51) Int. Cl.
*C08L 69/00* (2006.01)
*C08L 33/14* (2006.01)
*C08F 220/18* (2006.01)

(52) U.S. Cl.
CPC ............ *C08L 69/00* (2013.01); *C08F 220/18* (2013.01); *C08L 33/14* (2013.01)

(58) Field of Classification Search
None
See application file for complete search history.

(56) References Cited

U.S. PATENT DOCUMENTS

| | | | |
|---|---|---|---|
| 4,745,029 A | 5/1988 | Kambour | |
| 4,906,696 A | 3/1990 | Fischer et al. | |
| 5,169,885 A | 12/1992 | Hanayama et al. | |
| 5,200,492 A | 4/1993 | Ohnaga et al. | |
| 6,329,445 B1 | 12/2001 | Okumura et al. | |
| 6,414,100 B1 | 7/2002 | Daimon et al. | |
| 8,440,760 B2 | 5/2013 | Kim et al. | |
| 9,802,395 B2* | 10/2017 | Onishi | C08L 33/12 |
| 2002/0040081 A1 | 4/2002 | Stein et al. | |
| 2009/0258235 A1 | 10/2009 | Tateishi | |
| 2010/0152357 A1* | 6/2010 | Kwon | C08L 33/08 |
| | | | 524/502 |
| 2012/0231234 A1 | 9/2012 | Kodama | |
| 2012/0258312 A1 | 10/2012 | Higuchi et al. | |
| 2014/0371375 A1 | 12/2014 | Chung et al. | |
| 2015/0210851 A1 | 7/2015 | Tajima | |
| 2017/0198139 A1* | 7/2017 | Kouno | C08L 69/00 |
| 2017/0327685 A1 | 10/2017 | Kouno et al. | |

FOREIGN PATENT DOCUMENTS

| | | |
|---|---|---|
| CN | 101747610 | 6/2010 |
| CN | 101792500 | 8/2010 |
| CN | 103012665 | 4/2013 |
| JP | 62-131056 | 6/1987 |
| JP | 63-139935 | 6/1988 |
| JP | 64-1749 | 1/1989 |
| JP | 4-240212 | 8/1992 |
| JP | 4-359954 | 12/1992 |
| JP | 5-9359 | 1/1993 |
| JP | 9-25438 | 1/1997 |
| JP | 2000-119262 | 4/2000 |
| JP | 2000-249989 | 9/2000 |
| JP | 2010-116501 | 5/2010 |
| JP | 2011-500914 | 1/2011 |
| JP | 2012-167195 | 9/2012 |
| JP | 2012-219159 | 11/2012 |
| JP | 2014-062148 | 4/2014 |
| WO | 2013/094898 | 6/2013 |
| WO | 2014/038500 | 3/2014 |
| WO | 2015/053145 | 4/2015 |
| WO | 2015/093516 | 6/2015 |

OTHER PUBLICATIONS

Japanese application No. 2013-261731, filed Dec. 18, 2013. No publication date.*
International Search Report issued in PCT/JP2014/076252, dated Dec. 16, 2014.
Office Action from U.S. Appl. No. 15/535,580, dated Dec. 20, 2017.
Office Action from U.S. Appl. No. 15/324,416, dated Feb. 21, 2018.
European Search Report issued in European Application No. 15881231.3, dated Jun. 27, 2018.

* cited by examiner

*Primary Examiner* — David J Buttner
(74) *Attorney, Agent, or Firm* — Greenblum & Bernstein, P.L.C.

(57) ABSTRACT

A resin composition according to the present invention comprises: (A) a (meth)acrylic copolymer containing 5 to 85% by mass of a (meth)acrylate unit (a) represented by general formula (1) and 15 to 95% by mass of a methyl (meth)acrylate unit (b); and (B) a polycarbonate-type resin.

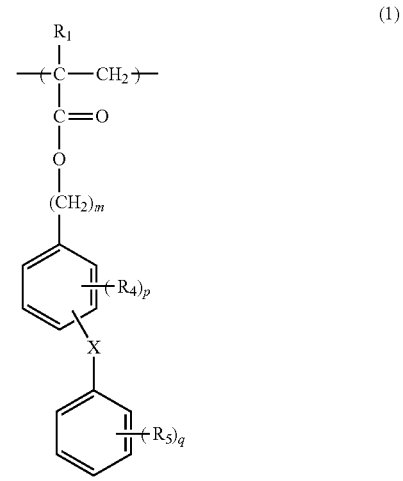

(1)

7 Claims, No Drawings

(METH)ACRYLIC COPOLYMER, RESIN COMPOSITION, AND MOLDED PRODUCT OF SAID RESIN COMPOSITION

TECHNICAL FIELD

The present invention relates to a (meth)acrylic copolymer, a resin composition comprising the same and a molded product of said resin composition.

BACKGROUND ART

Due to its excellent mechanical strength, heat resistance, electrical property, dimensional stability, flame retardance, transparency and the like, polycarbonate is extensively used in electric, electronic and office automation equipments, optical media, automotive parts, building components and the like.

Such polycarbonate is usually produced by an interface method in which bisphenol A (aromatic dihydroxy compound) and phosgene are directly reacted with each other, a melting method in which bisphenol A and diphenyl carbonate (diester carbonate) are subjected to transesterification reaction (polycondensation reaction) in a molten state, or the like.

However, a molded product obtained from a polycarbonate-based resin that is produced using bisphenol A as an aromatic dihydroxy compound comes short in terms of surface hardness, for example, for the application to automotive headlamps, spectacle lens and outdoor use such as sheets.

Therefore, a hard coat layer is often provided on the surface of the polycarbonate-based resin to enhance the surface hardness.

Providing a hard coat layer or the like on the surface, however, increases the number of steps of the production process, which decreases the production efficiency. Furthermore, in a case where a molded product has a complicated shape, it is difficult to provide a hard coat layer.

Accordingly, a considerable number of researches on enhancing the surface hardness while maintaining the transparency by blending a specific resin into a polycarbonate-based resin have been done. As the resin to be blended into a polycarbonate-based resin, a number of cases propose to use an acrylic resin that is transparent like the polycarbonate-based resin. For example, Patent Documents 1 and 2 disclose resin compositions comprising a polycarbonate-based resin and an acrylic resin having a molecular weight in a specific range.

In addition, some cases propose to blend an acrylic copolymer. For example, Patent Documents 3 to 7 disclose resin compositions comprising a polycarbonate-based resin and a (meth)acrylic copolymer.

CITATION LIST

Patent Document

Patent Document 1: Japanese Patent Laid-Open No. S62-131056
Patent Document 2: Japanese Patent Laid-Open No. S63-139935
Patent Document 3: Japanese Patent Laid-Open No. S64-1749
Patent Document 4: Japanese Patent Laid-Open No. 2010-116501
Patent Document 5: Japanese Patent Laid-Open No. H4-359954
Patent Document 6: National Publication of International Patent Application No. 2011-500914
Patent Document 7: International Publication No. 2013/094898

SUMMARY

Technical Problem

The resin compositions proposed in Patent Documents 1 to 7 have difficulty in providing both sufficient surface hardness and transparency to the molded product, or the molding conditions are very restricted such that the physical properties, i.e., surface hardness and transparency, are compatible only under limited conditions.

Specifically, transparency of a molded product tends to be deteriorated as the molding temperature increases and further, in the case of injection molding, as the injection speed increases. Increase in the molding temperature as well as increase in the injection speed are critical factors for enhancing productivity and for producing a thin molded product.

Thus, the objective of the present invention is to provide a resin composition that allows a molded product with excellent surface hardness and transparency to be obtained under a wide range of molding conditions. Additionally, the present invention also has an objective of providing a molded product comprising the above-described resin composition and providing a (meth)acrylic copolymer as a component of the above-described resin composition.

Solution to Problem

The present inventors have undergone an intense study to solve the above-described problems, as a result of which they found that a resin composition comprising a (meth)acrylate unit having a specific skeleton can produce a molded product with excellent surface hardness and transparency under a wide range of molding conditions, thereby achieving the present invention. Specifically, the present invention is, for example, as follows.

[1] A resin composition comprising:
(A) a (meth)acrylic copolymer comprising 5 to 85% by mass of a (meth)acrylate unit (a) represented by General Formula (1) and 15 to 95% by mass of a methyl(meth)acrylate unit (b); and
(B) a polycarbonate-based resin:

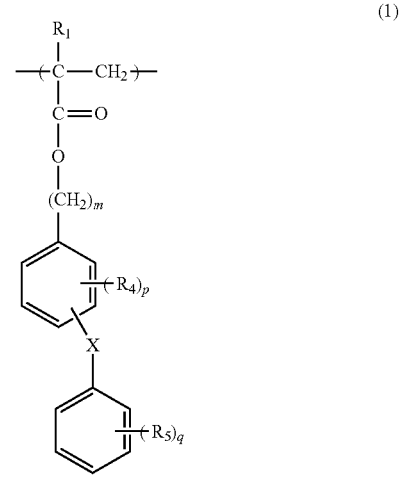

wherein
X represents a single bond, or a bivalent group selected from the group consisting of —C($R_2$)($R_3$)—, —C(=O)—, —O—, —OC(=O)—, —OC(=O)O—, —S—, —SO—, —SO$_2$— and a combination thereof, wherein R$_2$ and R$_3$ each independently represent a hydrogen atom, a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms, a phenyl group or a phenylphenyl group; or R$_2$ and R$_3$ may be bonded to each other so as to form a cyclic alkyl group having 3 to 10 carbon atoms together with a carbon atom to which they are attached;

R$_1$ represents a hydrogen atom or a methyl group;

R$_4$ and R$_5$ each independently represent a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms, a halogen atom, a phenyl group or phenylphenyl group;

m represents an integer of 1 to 10;

p represents an integer of 0 to 4; and q represents an integer of 0 to 5.

[1-a] The resin composition according to [1], wherein:

X represents a single bond, —C(R$_2$)(R$_3$)—, —C(=O)—, —SO— or —SO$_2$—;

R$_1$ represents a hydrogen atom or a methyl group;

R$_4$ and R$_5$ each independently represent a methyl group, a methoxy group, a chloro group, a bromo group or a phenyl group;

m represents an integer of 1 to 3;

p represents an integer of 0 to 1; and q represents an integer of 0 to 2.

[1-b] The resin composition according to [1] or [1-a], wherein the content of the (meth)acrylate unit (a) in the (meth)acrylic copolymer is 5 to 80% by mass while the content of the methyl(meth)acrylate unit (b) in the (meth)acrylic copolymer is 20 to 95% by mass.

[2] The resin composition according to any one of [1] to [1-b], wherein when the (meth)acrylic copolymer (A) is divided into a higher molecular weight region and a lower molecular weight region by setting a peak molecular weight value as a boundary, a ratio ((L)/(H)×100%), which is a ratio of a mass ratio (L) of the (meth)acrylate unit (a) in the (meth)acrylic copolymer (A) belonging to the lower molecular weight region to a mass ratio (H) of the (meth)acrylate unit (a) in the (meth)acrylic copolymer (A) belonging to the higher molecular weight region, is in a range of 80% to 120%.

[3] The resin composition according to any one of [1] to [2], wherein the mass-average molecular weight of the (meth)acrylic copolymer is 3,000 to 30,000.

[4] The resin composition according to any one of [1] to [3], wherein m in the General Formula (1) represents an integer of 1 to 3.

[5] The resin composition according to any one of [1] to [4], wherein X in the General Formula (1) represents a single bond, —C(R$_2$)(R$_3$)—, —C(=O)—, —SO— or —SO$_2$—.

[6] The resin composition according to any one of [1] to [5], wherein p and q in the General Formula (1) represent 0.

[7] The resin composition according to any one of [1] to [6], wherein the content of the (meth)acrylic copolymer (A) in the resin composition is 5 to 60% by mass while the content of the polycarbonate-based resin (B) in the resin composition is 40 to 95% by mass.

[8] A (meth)acrylic copolymer comprising 5 to 85% by mass of a (meth)acrylate unit (a) represented by General Formula (1) and 15 to 95% by mass of a methyl(meth)acrylate unit (b):

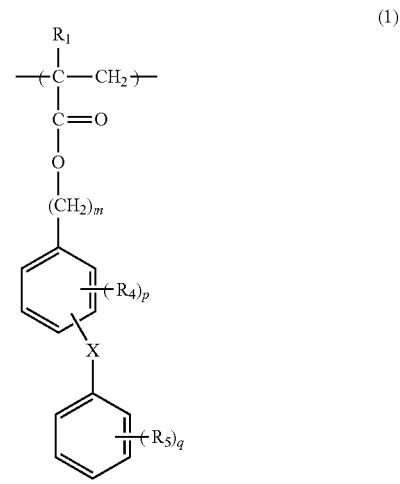

wherein

X represents a single bond, or a bivalent group selected from the group consisting of —C(R$_2$)(R$_3$)—, —C(=O)—, —O—, —OC(=O)—, —OC(=O)O—, —S—, —SO—, —SO$_2$— and a combination thereof, wherein R$_2$ and R$_3$ each independently represent a hydrogen atom, a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms, a phenyl group or a phenylphenyl group; or R$_2$ and R$_3$ may be bonded to each other so as to form a cyclic alkyl group having 3 to 10 carbon atoms together with a carbon atom to which they are attached;

R$_1$ represents a hydrogen atom or a methyl group;

R$_4$ and R$_5$ each independently represent a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms, a halogen atom, a phenyl group or phenylphenyl group;

m represents an integer of 1 to 10;

p represents an integer of 0 to 4; and q represents an integer of 0 to 5.

[8-a] The (meth)acrylic copolymer according to [8], wherein when the molecular weight of the (meth)acrylic copolymer (A) is divided into a higher molecular weight region and a lower molecular weight region by setting a peak molecular weight value as a boundary, a ratio ((L)/(H)×100%) of the mass ratio (L) of the (meth)acrylate unit (a) in the (meth)acrylic copolymer (A) belonging to the lower molecular weight region to the mass ratio (H) of the (meth)acrylate unit (a) in the (meth)acrylic copolymer (A) belonging to the higher molecular weight region, is in a range of 80% to 120%.

[8-b] The (meth)acrylic copolymer according to [8] or [8-a], wherein the mass-average molecular weight of the (meth)acrylic copolymer is 3,000 to 30,000.

[8-c] The (meth)acrylic copolymer according to any one of [8] to [8-b], wherein m in the General Formula (1) represents an integer of 1 to 3.

[8-d] The (meth)acrylic copolymer according to any one of [8] to [8-c], wherein X in the General Formula (1) represents a single bond, —C(R$_2$)(R$_3$)—, —C(=O)—, —SO— or —SO$_2$—.

[8-e] The (meth)acrylic copolymer according to any one of [8] to [8-d], wherein p and q in the General Formula (1) represent 0.

[8-f] The (meth)acrylic copolymer according to any one of [8] to [8-e], wherein the haze of a plate specimen with a thickness of 1.5 mm obtained by melt-kneading the (meth)acrylic copolymer and the polycarbonate-based resin (viscosity-average molecular weight: 22,000) at a rate of 30/70 (% by mass) and subjecting the resultant to injection molding at an injection temperature of 300° C., an injection speed of 300 m/sec and a die temperature of 80° C. is 12% or lower.

[8-g] The (meth)acrylic copolymer according to [8-f], wherein the pencil hardness of the plate specimen is HB or harder

[9] A molded product obtained by molding the resin composition according to any one of [1] to [7].

Advantageous Effects of Invention

The present invention can provide a resin composition that allows a molded product with excellent surface hardness and transparency to be obtained under a wide range of molding conditions. Specifically, since said resin composition allows injection molding at high speed, productivity can be enhanced. In addition, the present invention can also provide a molded product comprising the above-described resin composition and a (meth)acrylic copolymer as a component of the above-described resin composition.

DESCRIPTION OF EMBODIMENTS

Hereinafter, embodiments of the present invention will be described in detail.

A resin composition according to an embodiment of the present invention comprises:

(A) a (meth)acrylic copolymer comprising 5 to 85% by mass of a (meth)acrylate unit (a) represented by General Formula (1) described later and 15 to 95% by mass of a methyl(meth)acrylate unit (b); and (B) a polycarbonate-based resin.

The resin composition of the embodiment allows a molded product that has excellent surface hardness to be obtained since the (meth)acrylic copolymer is contained, while maintaining excellent transparency that is inherent in the polycarbonate-based resin.

As described above, in a case of a resin composition containing a combination of a prior art polycarbonate-based resin and other resin, the transparency of the molded product tends to be reduced as the molding temperature increases (about 280° C. or higher), or, in the case of injection molding, as the injection speed increases (about 150 mm/sec or more). On the other hand, a molded product having excellent transparency can be obtained when a resin composition according to the embodiment is molded even under a high temperature condition, and, in a case of injection molding, even at a high injection speed.

The reason why a molded product having high transparency can be obtained as described above is uncertain, but in a (meth)acrylate unit (a) represented by General Formula (1) described later, a benzene ring of an ester moiety seems to have an action of enhancing the transparency of the molded product. In particular, a (meth)acrylate unit having two or more benzene rings has good compatibility with a polycarbonate-based resin (B) and thus seems to be capable of maintaining the transparency of the molded product under a wide range of molding conditions.

Furthermore, the (meth)acrylate unit (a) represented by General Formula (1) described later is almost uniformly introduced into the (meth)acrylic copolymer (A). This phenomenon occurs regardless of the molecular weight of the (meth)acrylic copolymer (A) (see Examples below). Since such a structural unit that has superior compatibility with the polycarbonate-based resin (B) is uniformly present in the (meth)acrylic copolymer (A), the haze can be reduced even when the (meth)acrylic copolymer (A) is mixed with the polycarbonate-based resin (B), which is presumed to contribute to the high transparency of the molded product.

Meanwhile, excellent surface hardness of the resin composition according to the embodiment appears to result from the fact that a certain amount of the methyl(meth)acrylate unit (b) that is superior in surface hardness is added. This effect can also be obtained regardless of the molding conditions thereof. Accordingly, a resin composition according to the embodiment allows a molded product that has both high transparency and high surface hardness to be obtained under a wide range of molding conditions. Since an excellent molded product can be obtained under a wide range of molding conditions, a molded product can be produced efficiently and inexpensively. The resin composition according to the embodiment can be used in a wide range of fields, for example, applications that requires transparency such as materials for optical media and applications that requires color developing property such as chassis.

Hereinafter, each component contained in the resin composition according to the embodiment will be described.

1. (Meth)Acrylic Copolymer (A)

A (meth)acrylic copolymer (A), i.e., a component of a resin composition according to an embodiment of the present invention, contains a (meth)acrylate unit (a) represented by General Formula (1) and a methyl(meth)acrylate unit (b). Hereinafter, each of them will be described.

(1) (Meth)Acrylate Unit (a)

The (meth)acrylate unit (a) is represented by General Formula (1) below. Herein, acrylate and methacrylate are collectively referred to as (meth)acrylate.

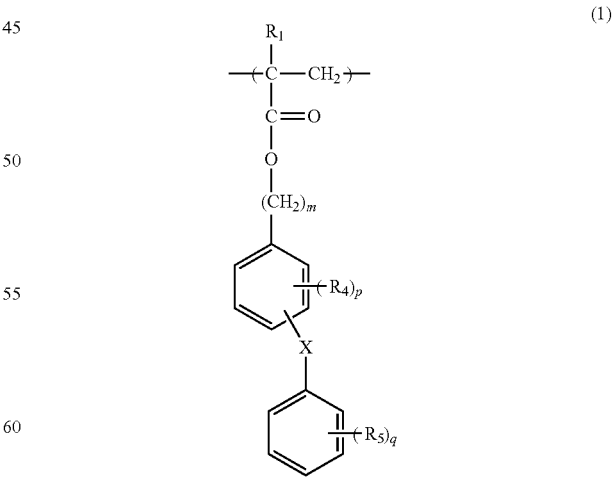

The (meth)acrylate unit (a) represented by General Formula (1) has two or more benzene rings in the ester moiety, and has a structural feature in that the oxygen atom and the benzene rings are not directly bonded in the ester moiety.

Since the (meth)acrylate unit (a) has good compatibility with the polycarbonate-based resin (B), it can contribute to improvement of transparency of the resulting molded product.

In General Formula (1) above, $R_1$ represents a hydrogen atom or a methyl group, preferably a methyl group.

X represents a single bond, or a bivalent group selected from the group consisting of —C($R_2$)($R_3$)—, —C(=O)—, —O—, —OC(=O)—, —OC(=O)O—, —S—, —SO—, —$SO_2$— and a combination thereof, wherein, $R_2$ and $R_3$ each independently represent a hydrogen atom, a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms, a phenyl group or a phenylphenyl group. They may have a substituent, which may be, for example, a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms and a halogen atom.

X preferably represents a single bond, —C($R_2$)($R_3$)—, —C(=O)—, —SO— or —$SO_2$—, and more preferably represents a single bond. $R_2$ and $R_3$ are each independently preferably selected from a hydrogen atom, a methyl group, a methoxy group, a phenyl group and a phenylphenyl group, and more preferably a hydrogen atom.

$R_2$ and $R_3$ may be bonded to each other so as to form a cyclic alkyl group having 3 to 10 carbon atoms together with a carbon atom to which they are attached.

$R_4$ and $R_5$ each independently represent a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms, a halogen atom, a phenyl group or a phenylphenyl group. These groups may be substituted with, for example, a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms and a halogen atom.

$R_4$ and $R_5$ are each independently preferably selected from a methyl group, a methoxy group, a chloro group, a bromo group and a phenyl group, and more preferably a phenyl group.

m represents an integer of 1 to 10, preferably an integer of 1 to 3, and more preferably 1.

p represents an integer of 0 to 4, preferably an integer of 0 to 1, and more preferably 0.

q represents an integer of 0 to 5, preferably an integer of 0 to 2, and more preferably 0.

Examples of the (meth)acrylate compound represented by General Formula (1) include 4-phenylbenzyl(meth)acrylate, 3-phenylbenzyl(meth)acrylate, 2-phenylbenzyl(meth)acrylate, 4-biphenylbenzyl(meth)acrylate, 3-biphenylbenzyl(meth)acrylate, 2-biphenylbenzyl(meth)acrylate, 4-benzylbenzyl(meth)acrylate, 3-benzylbenzyl(meth)acrylate, 2-benzylbenzyl(meth)acrylate, 4-phenethylphenyl(meth)acrylate, 4-phenethylphenethyl(meth)acrylate, 3-phenethylphenethyl(meth)acrylate, 2-phenethylphenethyl(meth)acrylate, 4-(4-methylphenyl)benzyl(meth)acrylate, 3-(4-methylphenyl)benzyl(meth)acrylate, 2-(4-methylphenyl)benzyl(meth)acrylate, 4-(4-methoxyphenyl)benzyl(meth)acrylate, 3-(4-methoxyphenyl)benzyl(meth)acrylate, 2-(4-methoxyphenyl)benzyl(meth)acrylate, 4-(4-bromophenyl)benzyl(meth)acrylate, 3-(4-bromophenyl)benzyl(meth)acrylate, 2-(4-bromophenyl)benzyl(meth)acrylate, 4-benzoylbenzyl(meth)acrylate, 3-benzoylbenzyl(meth)acrylate, 2-benzoylbenzyl(meth)acrylate, 4-(phenylsulfinyl)benzyl(meth)acrylate, 3-(phenylsulfinyl)benzyl(meth)acrylate, 2-(phenylsulfinyl)benzyl(meth)acrylate, 4-(phenylsulfonyl)benzyl(meth)acrylate, 3-(phenylsulfonyl)benzyl(meth)acrylate, 2-(phenylsulfonyl)benzyl(meth)acrylate, 4-((phenoxycarbonyl)oxy)benzyl(meth)acrylate, 3-((phenoxycarbonyl)oxy)benzyl(meth)acrylate, 2-((phenoxycarbonyl)oxy)benzyl(meth)acrylate, 4-(((meth)acryloxy)methyl)phenyl benzoate, 3-(((meth)acryloxy)methyl)phenyl benzoate, 2-(((meth)acryloxy)methyl)phenyl benzoate, phenyl 4-(((meth)acryloxy)methyl)benzoate, phenyl 3-(((meth)acryloxy)methyl)benzoate, phenyl 2-(((meth)acryloxy)methyl)benzoate, 4-(1-phenylcyclohexyl)benzyl(meth)acrylate, 3-(1-phenylcyclohexyl)benzyl(meth)acrylate, 2-(1-phenylcyclohexyl)benzyl(meth)acrylate, 4-phenoxybenzyl(meth)acrylate, 3-phenoxybenzyl(meth)acrylate, 2-phenoxybenzyl(meth)acrylate, 4-(phenylthio)benzyl(meth)acrylate, 3-(phenylthio)benzyl(meth)acrylate, 2-(phenylthio)benzyl(meth)acrylate and 3-methyl-4-(2-methylphenyl)benzylmethacrylate. They may be used alone or two or more types of them may be used in combination. Among them, 4-phenylbenzyl(meth)acrylate, 3-phenylbenzyl(meth)acrylate, 2-phenylbenzyl(meth)acrylate, 4-biphenylbenzyl(meth)acrylate, 3-biphenylbenzyl(meth)acrylate and 2-biphenylbenzyl(meth)acrylate are preferable, and 4-phenylbenzyl(meth)acrylate, 3-phenylbenzyl(meth)acrylate and 2-phenylbenzyl(meth)acrylate are more preferable.

(2) Methyl(Meth)Acrylate Unit (b)

The (meth)acrylic copolymer (A) further comprises the methyl(meth)acrylate unit (b). A monomer constituting the methyl(meth)acrylate unit (b) is methyl(meth)acrylate. Herein, acrylate and methacrylate are collectively referred to as (meth)acrylate. As the methyl(meth)acrylate unit (b), a known monomer can be used. Since the methyl(meth)acrylate unit (b) has good dispersibility in the polycarbonate-based resin (B), it has a capacity to enhance the surface hardness of the molded product.

Preferably, the methyl(meth)acrylate unit (b) is either methylmethacrylate or a combination of methylmethacrylate and methylacrylate.

Subsequently, the (meth)acrylic copolymer (A) will be described.

The (meth)acrylic copolymer (A) contains 5 to 85% by mass of the (meth)acrylate unit (a) represented by General Formula (1) and 15 to 95% by mass of the methyl(meth)acrylate unit (b) with respect to said copolymer. 5% or more by mass of the (meth)acrylate unit (a) with respect to the (meth)acrylic copolymer (A) contributes to a transparency. On the other hand, when the (meth)acrylate unit (a) having benzene rings in the ester moiety is copolymerized, the molded product of the (meth)acrylic copolymer (A) tends to have lower surface hardness including the pencil hardness. When the content of the methyl(meth)acrylate unit (b), however, is 15% or more by mass, the molded product of the (meth)acrylic copolymer (A) will have sufficient surface hardness. Therefore, by molding a resin composition obtained by melt-kneading this (meth)acrylic copolymer (A) and the polycarbonate-based resin (B) with relatively low surface hardness, a molded product having better surface hardness than a case of the polycarbonate-based resin (B) alone can be obtained.

The content of the (meth)acrylate unit (a) in the (meth)acrylic copolymer (A) is preferably 5 to 80% by mass and more preferably 10 to 40% by mass. In addition, the content of the methyl(meth)acrylate unit (b) in the (meth)acrylic copolymer (A) is preferably 20 to 95% by mass and more preferably 60 to 90% by mass.

The present inventors also found that, regardless of the polymerization method and the molecular weight thereof, the (meth)acrylic copolymer (A) has the property of being introduced with the (meth)acrylate unit (a) almost uniformly. When the (meth)acrylic copolymer (A) is divided into a higher molecular weight region and a lower molecular weight region by setting a peak molecular weight value as a boundary, a ratio ((L)/(H)×100%), which is a ratio of a mass ratio (L) of the (meth)acrylate unit (a) in the (meth)acrylic copolymer (A) belonging to the lower molecular weight region to a mass ratio (H) of the (meth)acrylate unit (a) in the (meth)acrylic copolymer (A) belonging to the higher molecular weight region, is close to 100%. This value is preferably in a range of 80% to 120%, and more preferably in a range of 85% to 115%. The above-described value close to 100% means that the (meth)acrylate unit (a) is introduced into the (meth)acrylic copolymer (A) in the lower molecular weight region and the higher molecular weight region to the same degree.

As described above, the (meth)acrylate unit (a) appears to contribute to the improvement of compatibility between the (meth)acrylic copolymer (A) and the polycarbonate-based resin (B). Therefore, due to the (meth)acrylate unit (a) is uniformly present in the (meth)acrylic copolymer (A), the compatibility between the (meth)acrylic copolymer (A) and the polycarbonate-based resin (B) can further be improved, which is presumed to contribute to the improvement of the transparency of the resulting molded product.

As to the method for determining the mass ratio (H) of the (meth)acrylate unit (a) belonging to the higher molecular weight region and the mass ratio (L) of the (meth)acrylate unit (a) belonging to the lower molecular weight region, see Example described below.

The mass-average molecular weight of the (meth)acrylic copolymer (A) is preferably 3,000 to 30,000, more preferably 5,000 to 20,000 and particularly preferably 8,000 to 14,000. The mass-average molecular weight of 3,000 to 30,000 is preferable in terms of good compatibility with the polycarbonate-based resin (B), and in terms of transparency and surface hardness of the molded product. When the mass-average molecular weight is greater than 30,000, the (meth)acrylic copolymer (A) can easily agglutinate when being sheared upon molding and thus the transparency of the resulting molded product tends to be deteriorated. On the other hand, when the mass-average molecular weight is less than 3,000, the mechanical physical properties such as impact resistance and pencil hardness of the resulting molded product tends to be deteriorated.

Here, the mass-average molecular weight (Mw), the number average molecular weight (Mn) and the molecular weight distribution (Mw/Mn) of the (meth)acrylic copolymer (A) can be measured using gel permeation chromatography.

The above-described (meth)acrylic copolymer (A) may also be produced by copolymerizing further with other monomer (hereinafter, referred to as component (c)), as needed. The component (c) is not particularly limited as long as it does not have adverse effect on the properties of the resin composition, and examples include methacrylates such as ethyl methacrylate, butyl methacrylate, propyl methacrylate, and 2-ethylhexyl methacrylate; acrylates such as ethyl acrylate, butyl acrylate, propyl acrylate, 2-ethylhexyl acrylate and glycidyl acrylate; vinyl cyanide monomers such as acrylonitrile and methacrylonitrile; dienic monomers such as butadiene, isoprene and dimethyl butadiene; vinyl ether-based monomers such as vinyl methyl ether and vinyl ethyl ether; carboxylic-acid-based vinyl monomers such as vinyl acetate and vinyl butylate; olefinic monomers such as ethylene, propylene and isobutylene; ethylenic unsaturated carboxylic acid monomers such as acrylic acid, methyacrylic acid, maleic acid and itaconic acid; halogenated vinyl monomers such as vinyl chloride and vinylidene chloride; maleimide-based monomers such as maleimide, N-phenylmaleimide, N-cyclohexylmaleimide and N-methylmaleimide; and crosslinking agents such as allyl(meth)acrylate, divinylbenzene and 1,3-buthylenedimethacrylate. Among them, methacrylate, acrylate and a vinyl cyanide monomer are preferable while acrylate is more preferable in terms of preventing thermal decomposition of the (meth)acrylic copolymer (A). These monomers can be used alone or two or more of them may be used in combination.

When other monomer as component (c) is contained, it is preferably contained at 0.1 to 10% by mass, more preferably 0.1 to 5% by mass and particularly preferably 0.1 to 3% by mass with respect to the (meth)acrylic copolymer (A). The most preferably, the (meth)acrylic copolymer (A) contains the (meth)acrylate unit (a) at 5 to 79.9% by mass, the methyl(meth)acrylate unit (b) at 20 to 94.9% by mass and other component (c) at 0.1 to 10% by mass.

When the content of the component (c) is 0.1% or more by mass, heat decomposition of the (meth)acrylic copolymer (A) can be prevented, and no adverse effect is placed on the surface hardness and transparency of the molded product as long as the content is 10% or less by mass.

The polymerization method for obtaining the above-described (meth)acrylic copolymer (A) is not particularly limited and a known method such as emulsion polymerization, suspension polymerization, solution polymerization or block polymerization may be employed. Suspension polymerization and block polymerization are preferable while suspension polymerization is more preferable. Moreover, additives and the like which are required for polymerization can appropriately be added as necessary. Examples of such additive include a polymerization initiator, an emulsifier, a dispersant and a chain transfer agent.

The polymerization temperature is preferably 50° C. to 150° C. and more preferably 70° C. to 130° C., which may vary with the (meth)acrylate monomer composition and the additives such as the polymerization initiator. The polymerization may be carried out by increasing the temperature in a multi-step manner.

Although polymerization time may vary depending on the polymerization method, the (meth)acrylate monomer composition and the additives such as the polymerization initiator, it is preferably 1 to 8 hours and more preferably 2 to 6 hours at the intended temperature. To this polymerization time, the time that takes to reach the intended temperature should further be added.

Although the reaction pressure may vary with the polymerization method, the (meth)acrylate monomer composition and the like, the polymerization is carried out preferably at a reaction pressure of ordinary pressure to 3 MPa and more preferably at a reaction pressure of ordinary pressure to 1 MPa.

One embodiment of the present invention provides a (meth)acrylic copolymer comprising 5 to 85% by mass of the (meth)acrylate unit (a) represented by General Formula (1) and 15 to 95% by mass of the methyl(meth)acrylate unit (b):

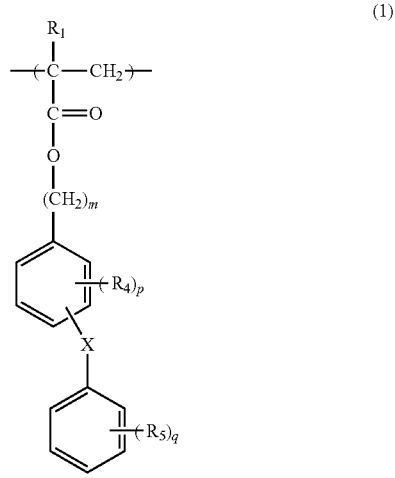

(1)

Definition of each group in General Formula (1) as well as the details of the (meth)acrylate unit (a) and the methyl (meth)acrylate unit (b) are as described above. Moreover, the usefulness of this (meth)acrylic copolymer is also as described above.

2. Polycarbonate-Based Resin (B)

A resin composition according to an embodiment of the present invention comprises a polycarbonate-based resin (B).

The polycarbonate-based resin (B) is not particularly limited as long as it contains a carbonate bond in the main chain of the molecule, i.e., it has a —[O—R—OCO]-unit. R in the formula may represent any of an aliphatic group, an aromatic group or both aliphatic and aromatic groups. Among them, aromatic polycarbonate that is obtained using an aromatic dihydroxy compound such as bisphenol A is favorable regarding cost. Furthermore, these polycarbonate-based resins can be used alone or two or more of them may be used in combination.

The viscosity-average molecular weight (Mv) of the polycarbonate-based resin (B) can be calculated by a viscosity measurement, which is preferably 15,000 to 30,000 and more preferably 17,000 to 25,000. As long as the viscosity-average molecular weight is within the above-mentioned range, a molded product having good compatibility with the (meth)acrylic copolymer (A) and better transparency and surface hardness can be obtained.

The method for producing the polycarbonate-based resin (B) can appropriately be selected depending on the monomer used as the base material. Examples include phosgene method and transesterification method. Alternatively, one that is available on the market can also be used. For example, Iupilon (registered trademark) S-3000 (manufactured by Mitsubishi Engineering-Plastics Corporation, Mv=22,000), Tarflon (registered trademark) FN1700 (manufactured by Idemitsu Kosan, Mv=18,000) or the like can be used.

A resin composition according to an embodiment of the present invention preferably contains the (meth)acrylic copolymer (A) at 5 to 60% by mass and the polycarbonate-based resin (B) at 40 to 95% by mass (with respect to the resin composition). Preferably, a resin composition according to an embodiment of the present invention contains the (meth)acrylic copolymer (A) at 10 to 50% by mass and the polycarbonate-based resin (B) at 50 to 90% by mass (with respect to the resin composition). If the content of the (meth)acrylic copolymer (A) in the resin composition is 5% or more by mass, the compatibility between the (meth)acrylic copolymer (A) and the polycarbonate-based resin (B) and the fluidity can be improved. While the haze tends to increase if the content of the (meth)acrylic copolymer (A) is too much, deterioration of the transparency of the resulting molded product can be prevented as long as the content of the (meth)acrylic copolymer (A) is 60% or less by mass.

The resin composition according to an embodiment of the present invention may also contain other resin, additive or the like as necessary to an extent that does not inhibit the effect of the present invention.

Examples of other resin include polystyrene-based resins such as ABS, HIPS, PS and PAS; polyester-based resins such as polyethylene terephthalate and polybutylene terephthalate; polyolefin-based resins; polymer alloys such as elastomers that are blended with other thermoplastic resins. The content of such resin is preferably within a range that does not impair the physical properties such as heat resistance, impact resistance and flame retardance that are inherent in the polycarbonate-based resin (B). Specifically, it is preferably 50 parts or less by mass with respect to the total of 100 parts by mass of the (meth)acrylic copolymer (A) and the polycarbonate-based resin (B).

Furthermore, examples of the additive that can be contained in the above-described resin composition include a stabilizer, a strengthening agent, a weather proofing agent, an inorganic filler, an impact resistance modifying agent, a flame retardant, an antistatic agent, a mold release agent, a pigment and fluoroolefin. Specifically, talc, mica, calcium carbonate, glass fiber, carbon fiber, potassium titanate fiber or the like may be used in order to improve the strength, the stiffness, the flame retardance or the like of the molded product. Furthermore, a polyester-based resin such as polyethylene terephthalate for improving the chemical resistance or the like, a rubber-like elastic body having a bilayer core-shell structure for improving the impact resistance, or the like may also be contained.

Examples of the above-mentioned stabilizer include triphenyl phosphite, tris(nonylphenyl)phosphite, distearylpentaerythritol diphosphite, diphenylhydrogen phosphite and stearyl-β-(3,5-di-tert-butyl-4-hydroxyphenyl)propionate (trade name "IRGANOX 1076", manufactured by Ciba Japan). Examples of the above-mentioned weather proofing agent include 2-(2'-hydroxy-5'-methylphenyl)benzotriazole, 2-(2'-hydroxy-3',5'-di-tert-amylphenyl)benzotriazole, 2-(2'-hydroxy-4'-octoxyphenyl)benzotriazole and 2-hydroxy-4-octoxybenzophenone.

A resin composition according to an embodiment of the present invention can be produced by a method in which the (meth)acrylic copolymer (A) and the polycarbonate-based resin (B) are mixed in a powdered state or a method in which they are melted by heating and kneaded. For such mixing, for example, a Henschel mixer, a Bunbury mixer, a single-screw-type extruder, a twin-screw-type extruder, a two spindle roller, a kneader, a Brabender or the like can be used.

3. Molded Product

One embodiment of the present invention provides a molded product that is obtained by molding the above-described resin composition.

A resin composition according to an embodiment of the present invention is capable of providing a molded product that has both excellent transparency and surface hardness even when molded under high temperature conditions. For example, haze of a plate specimen with a thickness of 1.5 mm that is obtained by melt-kneading the (meth)acrylic copolymer (A) and the polycarbonate-based resin (B) (viscosity-average molecular weight: 22,000) at a rate of 30/70 (% by mass) and subjecting the resultant to injection molding at an injection temperature of 300° C., an injection speed of 300 m/sec and a die temperature of 80° C. is preferably 12% or lower, more preferably 10% or lower and particularly preferably 5% or lower. Also, the pencil hardness of the above-described plate specimen is preferably HB or harder and more preferably F or harder.

As described above, the molded product according to the embodiment maintains the properties such as excellent mechanical strength, heat resistance, electrical property, dimensional stability, flame retardance and transparency of the polycarbonate-based resin (B) while also having excellent surface hardness. Therefore, the molded product according to the embodiment can be utilized in electric, electronic and office automation equipments, optical media, automobile parts, building components or the like.

Examples of the method for molding include compression molding, transfer molding, injection molding, blow molding, extrusion molding, lamination molding and calender molding. In the case of injection molding, the injection molding conditions of an injection temperature of 230 to 330° C., an injection speed of 10 to 500 mm/sec and a die temperature of 60° C. or higher are favorable in terms of improving the surface hardness. Since the resin composition according to the embodiment allows increase of the injection speed, it is also favorable in terms of productivity.

EXAMPLES

Hereinafter, the present invention will be described in detail with reference to examples, but the technical scope of the present invention should not be limited thereto. In the examples, "parts" and "%" mean "parts by mass" and "% by mass", respectively.

Furthermore, the respective physical properties in Examples and Comparative Examples were measured by the following methods.

1. Molecular Weight of (Meth)Acrylic Copolymer

A (meth)acrylic copolymer was dissolved in tetrahydrofuran (THF) and subjected to measurement using gel permeation chromatography. Mw, Mn and Mw/Mn of each copolymer were calculated based on a calibration curve for standard polystyrene.

Instrument: HLC-8320GPCEcoSEC manufactured by Tosoh
Column: TSK gel Super H M-H×3 manufactured by Tosoh
Mobile phase solvent: THF
Flow rate: 0.6 mL/min
Temperature: 40° C.
Sample concentration: 0.1%
Sample injection amount: 10 μL
Detector: RI (UV)

2. Distribution of (Meth)Acrylate Unit Represented by General Formula (1) in (Meth)Acrylic Copolymer The (meth)acrylic copolymer was dissolved in chloroform ($CHCl_3$) and performed separation using preparative gel permeation chromatography (preparative GPC) to divide into a higher molecular weight region and a lower molecular weight region by setting a peak of the molecular weight as a boundary. Thereafter, the separated copolymer was measured by $^1H$ NMR, and the mass ratio (H) of the (meth)acrylate unit represented by General Formula (1) in the (meth)acrylic copolymer belonging to the higher molecular weight region and the mass ratio (L) of the (meth)acrylate unit (a) represented by General Formula (1) in the (meth) acrylic copolymer belonging to the lower molecular weight region were calculated. Additionally, the copolymerization ratio ((L)/(H)×100%) was calculated.

(Preparative GPC)
Instrument: LC-9104 manufactured by Japan Analytical Industry
Column: JAIGEL-2.5H×1, JAIGEL-3H×1 manufactured by Japan Analytical Industry
Mobile phase solvent: $CHCl_3$
Flow rate: 3.5 mL/min
Temperature: 40° C.
Sample concentration: 10%
Sample injection amount: 5 mL
Detector: RI (UV)

($^1H$ NMR)
Instrument: Ascend™ 500 manufactured by Bruker
Solvent: $CHCl_3$
Sample concentration: 2.5 mg/mL
Accumulation number: 16

3. Pencil Hardness

A plate specimen with a thickness of 1.5 mm was prepared, and pencil hardness with no scratch observed on the surface of the specimen was measured following JIS K5600-5-4.

4. Transparency

Haze of a plate specimen with a thickness of 1.5 mm was measured using Haze meter NDH4000 (manufactured by Nippon Denshoku Industries) following JIS K 7136.

Synthesis Example 1

Synthesis of (Meth)Acrylic Copolymer a 200 parts by mass of deionized water, 0.5 parts by mass of tricalcium phosphate as a suspension stabilizer and 0.01 parts by mass of sodium dodecylbenzene sulfonate as a surfactant were added and then stirred in a heatable high-pressure reactor equipped with a stirring device. Concurrently, 20 parts by mass of 4-phenylbenzylmethacrylate (a-1), 77 parts by mass of methylmethacrylate (b-1), 3 parts by mass of methylacrylate (b-2), 0.3 parts by mass of Perbutyl E (manufactured by NOF Corporation) as an initiator and 1.75 parts by mass of normal-octylmercaptan (nOM) as a chain transfer agent were mixed and obtained a homogeneous monomer solution, which was added into the reactor. The reactor was filled with nitrogen and increased the pressure to 0.1 MPa. Reaction is carried out at 110° C. for an hour followed by 120° C. for 2 hours to complete the polymerization reaction. The resulting bead-like polymer was washed with water and dried to obtain a (meth)acrylic copolymer a.

Synthesis Example 2

Synthesis of (Meth)Acrylic Copolymer b

A (meth)acrylic copolymer b was obtained by the same method as Synthesis example 1 except that methylmethacrylate (b-1) was 80 parts by mass and methylacrylate (b-2) was 0 part by mass.

Synthesis Example 3

Synthesis of (Meth)Acrylic Copolymer c

A (meth)acrylic copolymer c was obtained by the same method as Synthesis example 1 except that 4-phenylbenzylmethacrylate (a-1) was 40 parts by mass and methylmethacrylate (b-1) was 57 parts by mass.

Synthesis Example 4

Synthesis of (Meth)Acrylic Copolymer d

A (meth)acrylic copolymer d was obtained by the same method as Synthesis example 1 except that 4-phenylbenzylmethacrylate (a-1) was 80 parts by mass and methylmethacrylate (b-1) was 17 parts by mass.

Synthesis Example 5

Synthesis of (Meth)Acrylic Copolymer e

A (meth)acrylic copolymer e was obtained by the same method as Synthesis example 4 except that normal-octylmercaptan (nOM) as a chain transfer agent was 1.00 part by mass.

Synthesis Example 6

Synthesis of (Meth)Acrylic Copolymer f

A (meth)acrylic copolymer f was obtained by the same method as Synthesis example 4 except that normal-octylmercaptan (nOM) as a chain transfer agent was 0.50 parts by mass.

Synthesis Example 7

Synthesis of (Meth)Acrylic Copolymer g

A (meth)acrylic copolymer g was obtained by the same method as Synthesis example 1 except that normal-octylmercaptan (nOM) was 2.0 parts by mass.

Synthesis Example 8

Synthesis of (Meth)Acrylic Copolymer h

A (meth)acrylic copolymer h was obtained by the same method as Synthesis example 1 except that 4-phenylbenzylmethacrylate (a-1) was 4 parts by mass and methylmethacrylate (b-1) was 93 parts by mass.

Synthesis Example 9

Synthesis of (Meth)Acrylic Copolymer i

A (meth)acrylic copolymer i was obtained by the same method as Synthesis example 1 except that 4-phenylbenzylmethacrylate (a-1) was 90 parts by mass and methylmethacrylate (b-1) was 0 part by mass.

Synthesis Example 10

Synthesis of (Meth)Acrylic Copolymer j

A (meth)acrylic copolymer j was obtained by the same method as Synthesis example 1 except that phenylmethacrylate was used instead of 4-phenylbenzyl(meth)acrylate (a-1) and that normal-octylmercaptan (nOM) as a chain transfer agent was 2.50 parts by mass.

Synthesis Example 11

Synthesis of (Meth)Acrylic Copolymer k

A (meth)acrylic copolymer k was obtained by the same method as Synthesis example 1 except that benzylmethacrylate was used instead of 4-phenylbenzyl(meth)acrylate (a-1).

Synthesis Example 12

Synthesis of (Meth)Acrylic Copolymer m

A (meth)acrylic copolymer m was obtained by the same method as Synthesis example 10 except that 4-phenylphenylmethacrylate was used instead of phenylmethacrylate.

Synthesis Example 13

Synthesis of (Meth)Acrylic Copolymer n

A (meth)acrylic copolymer n was obtained by the same method as Synthesis example 10 except that 2-phenylphenylmethacrylate was used instead of phenylmethacrylate.

Synthesis Example 14

Synthesis of (Meth)Acrylic Copolymer o

A (meth)acrylic copolymer o was obtained by the same method as Synthesis example 1 except that 4-phenylbenzyl (meth)acrylate (a-1) was 0 part by mass and methylmethacrylate (b-1) was 97 parts by mass.

The compositions of the above-described Synthesis examples 1-14 are summarized in Table 1. In addition, the physical properties of the (meth)acrylic copolymers obtained in the above-described Synthesis examples 1-14 are summarized in Table 2.

TABLE 1

| (Meth)acrylic copolymer | Composition of (meth)acrylic copolymer (mass parts) | | | | | | | |
|---|---|---|---|---|---|---|---|---|
| | 4-Phenyl benzyl methacrylate (a-1) | Phenyl methacrylate | Benzyl methacrylate | 4-Phenylphenyl methacrylate | 2-Phenylphenyl methacrylate | Methyl methacrylate (b-1) | Methyl acrylate (b-2) | Normal octylmercaptan (nOM) |
| a | 20 | — | — | — | — | 77 | 3 | 1.75 |
| b | 20 | — | — | — | — | 80 | — | 1.75 |
| c | 40 | — | — | — | — | 57 | 3 | 1.75 |
| d | 80 | — | — | — | — | 17 | 3 | 1.75 |
| e | 80 | — | — | — | — | 17 | 3 | 1.00 |
| f | 80 | — | — | — | — | 17 | 3 | 0.50 |
| g | 20 | — | — | — | — | 77 | 3 | 2.00 |
| h | 4 | — | — | — | — | 93 | 3 | 1.75 |
| i | 90 | — | — | — | — | 7 | 3 | 1.75 |
| j | — | 20 | — | — | — | 77 | 3 | 2.50 |

TABLE 1-continued

| | Composition of (meth)acrylic copolymer (mass parts) | | | | | | | |
|---|---|---|---|---|---|---|---|---|
| (Meth)acrylic copolymer | 4-Phenyl benzyl methacrylate (a-1) | Phenyl methacrylate | Benzyl methacrylate | 4-Phenylphenyl methacrylate | 2-Phenylphenyl methacrylate | Methyl methacrylate (b-1) | Methyl acrylate (b-2) | Normal octylmercaptan (nOM) |
| k | — | — | 20 | — | — | 77 | 3 | 1.75 |
| m | — | — | — | 20 | — | 77 | 3 | 2.50 |
| n | — | — | — | — | 20 | 77 | 3 | 2.50 |
| o | — | — | — | — | — | 97 | 3 | 1.75 |

TABLE 2

| | Molecular weight of (meth)acrylic copolymer | | | (A) Proportion (% by mass) | | |
|---|---|---|---|---|---|---|
| (Meth)acrylic copolymer | Weight average molecular weight (Mw) | Number average molecular weight (Mn) | Dispersion (Mw/Mn) | Higher molecular weight region (H) | Lower molecular weight region (L) | (L)/(H) × 100 |
| a | 11,600 | 6,600 | 1.8 | 20.5 | 19.3 | 94.1 |
| b | 11,900 | 6,600 | 1.8 | 20.8 | 19.0 | 91.3 |
| c | 12,500 | 7,000 | 1.8 | 41.2 | 39.0 | 94.7 |
| d | 11,800 | 6,500 | 1.8 | 80.8 | 78.8 | 97.5 |
| e | 20,100 | 11,200 | 1.8 | 82.9 | 78.0 | 94.1 |
| f | 38,500 | 21,300 | 1.8 | 82.7 | 77.7 | 94.0 |
| g | 10,200 | 5,800 | 1.8 | 21.0 | 19.1 | 91.0 |
| h | 12,000 | 6,800 | 1.8 | 4.2 | 3.9 | 92.9 |
| i | 11,900 | 6,700 | 1.8 | 97.8 | 95 | 97.1 |
| j | 13,700 | 7,600 | 1.8 | 22.3 | 16.7 | 74.9 |
| k | 12,200 | 6,900 | 1.8 | 20.8 | 19.1 | 91.8 |
| m | 13,900 | 7,600 | 1.8 | 24 | 16.1 | 67.1 |
| n | 14,100 | 7,900 | 1.8 | 23.5 | 17 | 72.3 |
| o | 12,300 | 6,900 | 1.8 | — | — | — |

<Production of Resin Pellets>

The (meth)acrylic copolymers obtained in the above-described Synthesis examples and Iupilon (registered trademark) S-3000 (manufactured by Mitsubishi Engineering-Plastics Corporation, viscosity-average molecular weight: 22,000) as a polycarbonate-based resin were blended at mass ratios shown in Table 3 below. After mixing in a tumbler for 20 minutes, the resultant was supplied into "TEX30HSST" manufactured by Japan Steel Works equipped with a single vent, and kneaded under the conditions of a screw rotation speed of 200 rpm, a discharge rate of 20 kg/hour and a barrel temperature of 260° C. A molten resin extruded into a strand was rapidly cooled in a water tank, and pelleted using a pelletizer, thereby obtaining pellets of the resin composition.

<Production of Molded Product>

The pellets obtained by the above-described production method were dried at 100° C. for 5 hours and then subjected to injection molding in an injection molding machine ("SE100DU" manufactured by Sumitomo Heavy Industries) using a steel die at the following injection temperature and injection speed and a die temperature of 80° C., thereby obtaining a plate specimen of 50×90×thickness 1.5 mm.

Injection condition I: injection temperature 260° C., injection speed 200 mm/sec Injection condition II: injection temperature 300° C., injection speed 200 mm/sec Injection condition III: injection temperature 260° C., injection speed 300 mm/sec Injection condition IV: injection temperature 300° C., injection speed 300 mm/sec For each plate specimen, pencil hardness and transparency were determined as described above. The results are shown in Table 3 below.

TABLE 3

| | Additive amount (% by mass) | | | | Transparency (%) | | | |
|---|---|---|---|---|---|---|---|---|
| | (Meth)acrylic copolymer | (Meth)acrylic copolymer | Polycarbonate | Pencil hardness | Injection conditions I | Injection conditions II | Injection conditions III | Injection conditions IV |
| Example 1 | a | 20 | 80 | HB | 0.8 | 0.8 | 0.9 | 1.4 |
| Example 2 | a | 30 | 70 | F | 0.7 | 0.8 | 1.0 | 1.5 |
| Example 3 | a | 40 | 60 | H | 0.8 | 1.0 | 1.6 | 2.5 |
| Example 4 | b | 30 | 70 | F | 0.9 | 1.2 | 1.3 | 1.8 |
| Example 5 | c | 30 | 70 | F | 0.6 | 0.7 | 0.7 | 1.1 |
| Example 6 | d | 30 | 70 | HB | 0.6 | 0.6 | 0.7 | 0.9 |
| Example 7 | e | 30 | 70 | HB | 0.7 | 0.7 | 1.0 | 2.5 |
| Example 8 | f | 30 | 70 | HB | 0.6 | 1.0 | 1.5 | 5.0 |
| Example 9 | g | 30 | 70 | F | 0.7 | 0.8 | 0.8 | 1.2 |
| Comparative Example 1 | h | 30 | 70 | 2H | 8.9 | 10.5 | 18.5 | 25.5 |
| Comparative Example 2 | i | 30 | 70 | B | 0.6 | 0.6 | 0.7 | 0.9 |

TABLE 3-continued

| | Additive amount (% by mass) | | | Pencil hardness | Transparency (%) | | | |
|---|---|---|---|---|---|---|---|---|
| | (Meth)acrylic copolymer | (Meth)acrylic copolymer | Polycarbonate | | Injection conditions I | Injection conditions II | Injection conditions III | Injection conditions IV |
| Comparative Example 3 | j | 30 | 70 | F | 0.9 | 6.5 | 8.5 | 13.5 |
| Comparative Example 4 | k | 30 | 70 | HB | 0.8 | 7.0 | 7.5 | 13.0 |
| Comparative Example 5 | m | 30 | 70 | F | 0.6 | 4.0 | 7.6 | 13.1 |
| Comparative Example 6 | n | 30 | 70 | F | 0.7 | 3.6 | 6.8 | 12.7 |
| Comparative Example 7 | o | 30 | 70 | 2H | 15.8 | 20.0 | 21.5 | 45.5 |

As shown in Table 3, when resins obtained by blending one of the (meth)acrylic copolymers a to g and polycarbonate were subjected to injection molding (Examples 1 to 9), high surface hardness and high transparency resulted even at a high injection speed and a high injection temperature. On the other hand, as in the cases of the (meth)acrylic copolymers h and o, transparency was low when the (meth)acrylate unit represented by General Formula (1) was less than 5% (Comparative Examples 1 and 7). Furthermore, when the (meth)acrylic copolymer i that contains 85% or more by mass of the (meth)acrylate unit represented by General Formula (1) was used (Comparative Example 2), it had good transparency but the surface hardness was insufficient. When the (meth)acrylic copolymers j, m and n, each containing a (meth)acrylate unit in which an ester moiety is directly bonded to a benzene ring, are used (Comparative Examples 3, 5 and 6), the transparency may be deteriorated depending on the injection conditions. Even when the ester moiety and the benzene ring are not directly bonded to each other like the (meth)acrylic copolymer k that contains a (meth)acrylate unit having one benzene ring (Comparative Example 4), transparency may be deteriorated depending on the injection conditions.

The invention claimed is:

1. A resin composition comprising:
   (A) a (meth)acrylic copolymer containing 5 to 85% by mass of a (meth)acrylate unit (a) represented by General Formula (1) and 15 to 95% by mass of a methyl (meth)acrylate unit (b); and
   (B) a polycarbonate-based resin:

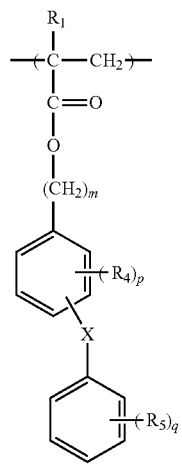

(1)

wherein
X represents a single bond, or a bivalent group selected from the group consisting of —C($R_2$)($R_3$)—, —C(=O)—, —O—, —OC(=O)—, —OC(=O)O—, —S—, —SO—, —$SO_2$— and a combination thereof,
wherein $R_2$ and $R_3$ each independently represent a hydrogen atom, a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms, a phenyl group or a phenylphenyl group; or $R_2$ and $R_3$ may be bonded to each other so as to form a cyclic alkyl group having 3 to 10 carbon atoms together with a carbon atom to which they are attached;
$R_1$ represents a hydrogen atom or a methyl group;
$R_4$ and $R_5$ each independently represent a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms, a halogen atom, a phenyl group or phenylphenyl group;
m represents an integer of 1 to 10;
p represents an integer of 0 to 4;
q represents an integer of 0 to 5;
wherein the mass-average molecular weight of the (meth)acrylic copolymer is 8,000 to 14,000; and
wherein when the (meth)acrylic copolymer (A) is divided into a higher molecular weight region and a lower molecular weight region by setting a peak molecular weight value as a boundary, a ratio ((L)/(H)×100%), which is a ratio of a mass ratio (L) of the (meth)acrylate unit (a) in the (meth)acrylic copolymer (A) belonging to the lower molecular weight region to a mass ratio (H) of the (meth)acrylate unit (a) in the (meth)acrylic copolymer (A) belonging to the higher molecular weight region, is in a range of 80% to 120%.

2. A molded product obtained by molding the resin composition according to claim 1.

3. The resin composition according to claim 1, wherein m in the General Formula (1) is 1.

4. The resin composition according to claim 1, wherein m in the General Formula (1) represents an integer of 1 to 3.

5. The resin composition according to claim 1, wherein X in the General Formula (1) represents a single bond, —C($R_2$)($R_3$)—, —C(=O)—, —SO— or —$SO_2$—.

6. The resin composition according to claim 1, wherein p and q in the General Formula (1) represent 0.

7. The resin composition according to claim 1, wherein the content of the (meth)acrylic copolymer (A) in the resin composition is 5 to 60% by mass while the content of the polycarbonate-based resin (B) in the resin composition is 40 to 95% by mass.

\* \* \* \* \*